(12) United States Patent
Andresen (10) Patent No.: US 8,008,793 B2
(45) Date of Patent: Aug. 30, 2011

(54) WIND POWER SYSTEM AND METHOD OF OPERATING IT

(75) Inventor: Björn Andresen, Østbirk (DK)

(73) Assignee: Gamesa Innovation & Technology, S.L., Sarriguren, Navarra (ES)

( * ) Notice: Subject to any disclaimer, the term of this patent is extended or adjusted under 35 U.S.C. 154(b) by 543 days.

(21) Appl. No.: 12/144,750

(22) Filed: Jun. 24, 2008

(65) Prior Publication Data

US 2009/0021013 A1  Jan. 22, 2009

(30) Foreign Application Priority Data

Jul. 16, 2007  (EP) .................................. 07380213

(51) Int. Cl.
*F03D 9/00* (2006.01)
*H02P 9/04* (2006.01)

(52) U.S. Cl. ........................................................ 290/44
(58) Field of Classification Search .................... 290/44, 290/55
See application file for complete search history.

(56) References Cited

U.S. PATENT DOCUMENTS

| | | | | |
|---|---|---|---|---|
| 6,906,431 B2* | 6/2005 | Wobben | .......................... | 290/44 |
| 7,439,714 B2* | 10/2008 | Llorente Gonzalez et al. | . | 322/24 |
| 7,741,728 B2* | 6/2010 | Fortmann et al. | ............... | 290/44 |
| 2003/0125923 A1* | 7/2003 | Grochowski et al. | ........... | 703/20 |
| 2005/0042098 A1* | 2/2005 | Wobben | .................... | 416/132 B |
| 2005/0116476 A1* | 6/2005 | Feddersen | ........................ | 290/44 |
| 2005/0154499 A1* | 7/2005 | Aldridge et al. | .............. | 700/286 |
| 2007/0132248 A1* | 6/2007 | Weng et al. | ..................... | 290/44 |
| 2009/0302608 A1* | 12/2009 | Andresen | ........................ | 290/44 |

FOREIGN PATENT DOCUMENTS

WO   WO 2005031160 A2 * 4/2005

* cited by examiner

*Primary Examiner* — Julio Gonzalez
(74) *Attorney, Agent, or Firm* — Ladas & Parry LLP (57) ABSTRACT

The wind power system comprises an installation (1) for generating electrical power from wind by means of at least one power generating turbine arranged to be rotated by wind, and a control system (2) including a power controller (22). The power controller (22) is configured to keep the magnitude of the total current below a pre-set maximum magnitude (Imax).

16 Claims, 3 Drawing Sheets

WIND POWER SYSTEM AND METHOD OF OPERATING IT

FIELD OF THE INVENTION

The present invention relates to the field of wind energy systems and devices, and more specifically to the control of the way power generated by such systems and devices is supplied to a network or grid for distribution of the power.

STATE OF THE ART

Wind energy systems include one or more wind power generators or turbines arranged to produce electrical energy by rotation induced by the wind. This electrical energy, generated by one or more of these generators (for example, by several generators forming part of or constituting a so-called "wind farm"), is supplied to a grid or network for distribution of the energy. Normally, a large number of electrical power generators are connected to the same grid, and normally several power consumers are also connected to the grid.

In order to maintain the voltage and frequency on the network substantially constant, it is important that the power input to the grid at each moment substantially equals the power that is consumed. Thus, generation of power (including the power generated by the individual generators or wind turbines and/or by one or more wind farms considered as a whole) has to be controlled and modified in accordance with the consumption.

A problem with wind energy, in comparison with other types of electrical power generation such as hydroelectric power generation, nuclear power, etc., is that the wind tends to fluctuate a lot also in the short term. If the wind power only represents a very small proportion of the power that is input to a network, these variations may not be very relevant for the general performance of the network. However, as wind power has increased in popularity and now makes up a substantial part of the total electrical power that is injected into the network, regulation of the way that wind power is injected and supplied to the grid (by individual wind turbines and/or by the wind farms considered as a whole) has become increasingly important. A large number of patents, patent applications and other documents relate to how to control the supply of wind power to the network.

One example of such a patent is U.S. Pat. No. 6,906,431 which appears to suggest that a plurality of wind power installations are provided with "a device for regulating the power to be delivered to the network, wherein the regulation is so adjusted that a constant apparent power is always fed to the network". It is said that the apparent power can be calculated in accordance with the formula $$S=\sqrt{P^2+Q^2}$$

wherein

S is the magnitude of the apparent power, P is the magnitude of the active power, and Q is the magnitude of the reactive power.

Now, this implies a problem in that thermal/current (I) design restrictions are not used. Basically, when operating this kind of system, it is important that the current flowing through any of the components does not exceed the maximum level that can be tolerated by the component; an excessive current can cause overheating and destroy the component.

Further, it is not clear in what way the system and method described in U.S. Pat. No. 6,906,431 can actually be implemented in a practical system. For example, always keeping the apparent power constant would appear to be very complex, not to say impossible, during, for example, a start-up phase of the wind generator or generators.

Also, when operating in a mode with substantially zero reactive power, the active power is to be kept substantially constant. Now, this is impossible during, for example, a start-up phase. On the other hand, if the start-up phase is not considered, keeping the active power constant is just a common way of regulating the power input to the grid: normally, a wind turbine is intended to produce its nominal active power output, which is then fed into the grid. Thus, it cannot be understood in what way the control method and system disclosed in U.S. Pat. No. 6,906,431 could be considered to imply any contribution over this conventional prior art way of operating (or intending to operate, as a 100% constant power output is impossible in practice, due to the tolerances inherent in any real-world components and control system) a wind turbine or wind farm. The same applies, mutatis mutandis, to the operation of the wind turbine substantially without generation of active power and constant generation of reactive power.

A further problem is that when operating a wind power system (such as a wind turbine or generator, or a wind farm comprising several wind turbines) with constant generation of power and injection of said power into the network, a decrease in the voltage will imply an increase in the current, if the power is to be kept constant. Now, this implies that if the current is originally close to the maximum current level established for the components involved, the higher currents can cause damage to said components. Thus, it may be necessary to keep the current substantially below the maximum levels determined by the components involved during normal operation of the wind power system, so as to allow for such an increase in the currents without any substantial damage to the components. However, this, in turn, basically requires that the components involved (conductors, transformers, etc.) are designed to withstand substantially higher currents than those that are normally present, which in turn implies additional costs, etc.

Thus, the control system and method disclosed in U.S. Pat. No. 6,906,431 appears to be difficult, not to say impossible, to implement in a real-world system and, even if successfully implemented, the method appears to imply problems related to the risk for overcurrents.

WO-A-2007/006565 discusses another way of controlling the power fed to the network from a wind power generator or a wind park. Here, a current is supplied that is higher than the nominal current. In this way, more power can be supplied to the network. The idea behind the system disclosed in WO-A-2007/006565 is based on the fact that the components involved with the transfer of the generated power to the network are dimensioned in accordance with the nominal performance of the generator, not considering the fact that there are substantial variations in the voltage. Thus, the disclosed system is alleged to manage to increase the supply of power to the grid while not damaging the components due to excessively high current.

Now, a problem involved with the system disclosed in WO-A-2007/006565 is that it can give rise to an increased output of power that actually can damage the mechanical parts of the generator, due to, for example, an excessive torque.

DESCRIPTION OF THE INVENTION

A first aspect of the invention relates to a wind power system, comprising an installation for generating electrical power from wind by means of at least one power generating turbine arranged to be rotated by wind (that is, the installation can basically comprise one wind turbine or an entire wind farm or part thereof), and a control system, said control system including a power controller for controlling the supply of electrical power (such as active and reactive power) from said wind power system (including the generating installation/turbine and the control system) to a network or grid for distribution of electrical power to a plurality of consumers. The power controller comprises means for controlling a current (total current) supplied to or towards said network by said wind power system in accordance with at least one input parameter (for example, input parameters indicative of a desired amount of active power and reactive power to be supplied to the grid, or input parameters indicative of active power and phase angle—such as a desired cos(φ) value or another indicator of the phase difference between current and voltage—).

The wind power system can, for example, comprise said installation connected to the network through a full converter, or a doubly-fed arrangement in which, for example, the installation can comprise one or more doubly-fed induction generators, such as a doubly-fed asynchronous machine. In both cases, the power controller can be arranged to operate on a converter, be it a full converter or a converter connecting the rotor windings to the grid while the stator windings are connected substantially directly to the grid, bypassing the converter. Of course, the installation can also be any other kind of installation, such as a direct connected asynchronous generator, etc.

The invention makes it possible to use the full current capability of the system (instead of looking only at the power), thus making it possible to increase the reactive power that can be supplied to the grid.

Thus, in accordance with the invention, the power controller is configured to keep the magnitude of the total current fed to the grid below a pre-set maximum magnitude (Imax), thereby preventing (or, at least, reducing) the risk for overcurrents in situations such as when there is a sudden voltage drop on the grid. Further, the control system is arranged to establish, in view of a measured network voltage, a maximum amount of reactive power (Qmax) that can be supplied towards said network (considering the amount of active power that is currently supplied towards the grid, or that should be allowed to be fed towards the grid if required), said maximum amount of reactive power being selected so that said total current will not exceed said pre-set maximum magnitude (Imax).

In this way, the risk for damages to components caused by the above-mentioned overcurrents is reduced. Thus, this current limitation restriction can be a restriction that prevails over the desired supply of active and reactive power, that is, if the desired active and reactive powers cannot be supplied without exceeding this current limit, the active power and/or the reactive power that is actually injected into the grid can be lower than the "desired" active and reactive powers (or the amount of active power and/or the phase angle can be modified with respect to the corresponding "desired" values).

In prior art systems, the current limitations were normally calculated on the basis of the power limitations of the system. However, according to the invention, advantage is taken of the full capability of the thermal design. Thus, by the use of the full current capability (in each specific situation, that is, in view of the measured network voltage and the amount of active power that is supplied or should be "available" for supply to the grid), the invention makes it possible to increase the reactive power that, under the prevailing conditions, can be supplied to the network.

Thus it is possible, even in under-voltage situations, to always use the full current up to the limits of the system, thus making it possible to support the grid by, for example, injection of reactive power.

The total current can be determined by the formula $$I = \sqrt{I_P^2 + I_Q^2}$$

wherein I is the amplitude of the total current, $I_P$ is the amplitude of the current component in phase with the voltage (the so-called active current), and $I_Q$ is the amplitude of the current component having a phase difference of $\pm\pi/2$ radians (that is, 90 degrees) with regard to the voltage (the so-called reactive current). $I_P$ and $I_Q$ are the total currents fed to the grid.

The power controller can be configured to operate the installation so that the wind power system supplies a predetermined amount of active power and a predetermined amount of reactive power towards the network in accordance with an active power reference signal or value and a reactive power reference signal or value (or a phase angle—or cos(φ)—reference signal or value), and the power controller can further be arranged to control the current and to adapt the active power and reactive power (or the phase angle/cos(φ)) so that the total current does not exceed said pre-set maximum magnitude (Imax). For example, the control system can be configured to increase the current supplied by the wind power system when there is a drop in the voltage at an output end of the wind power system, so as to continue to supply, as far as possible, said predetermined amounts of active power and reactive power, with the condition that the current may not exceed said pre-set maximum magnitude.

The system can be arranged so as to give preference to the supply of active power or to the supply of reactive power in a situation in which it is not possible to supply the pre-established (or desired) amounts of said active power and reactive power without letting the total current exceed said pre-set maximum magnitude (Imax). That is, and under the prevailing condition that the total current does not exceed said pre-established limit, the system can supply, as far as possible, the desired amounts of active and reactive power and when this is no longer possible without increasing the total current beyond the relevant limit, the active power or the reactive power is first reduced, in accordance with established or pre-programmed preference criteria.

The power controller can comprise a control loop for active power and a control loop for reactive power, wherein the control loop for active power can include means for generating an active current reference signal and wherein the control loop for reactive power can include means for generating a reactive current reference signal, wherein said control system further comprises means for limiting said active current reference signal and reactive current reference signal so as to prevent the total current from exceeding said pre-set maximum magnitude.

In this way, an effective and efficient current control can be implemented that reduces the risk of damage to the components involved with the power supply.

Said power controller can be arranged to limit said active current reference signal and reactive current reference signal in accordance with at least one preference indicator stored in the system, so that preference is given to the limitation either of said active current reference signal or said reactive current reference signal. For example, the power controller can be pre-programmed to conditionally or unconditionally give preference to the production of active power by giving preference to the limitation of the reactive current reference signal, thus as far as possible avoiding a reduction or limitation of the active current reference signal.

The system can be arranged so as to prevent the active power from increasing beyond a pre-determined level, thus allowing for a reduction of the apparent power when the phase angle between voltage and current decreases below a certain level, so as to prevent an excessive torque on mechanical components of the system.

Another aspect of the invention relates to a method of operating a wind power system, substantially as defined in the corresponding independent claim. What has been stated above with reference to the system is also applicable to the method of the invention, mutatis mutandis.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but just as an example of how the invention can be embodied. The drawings comprise the following figures.

DESCRIPTION OF A PREFERRED EMBODIMENT OF THE INVENTION

Figure 1:
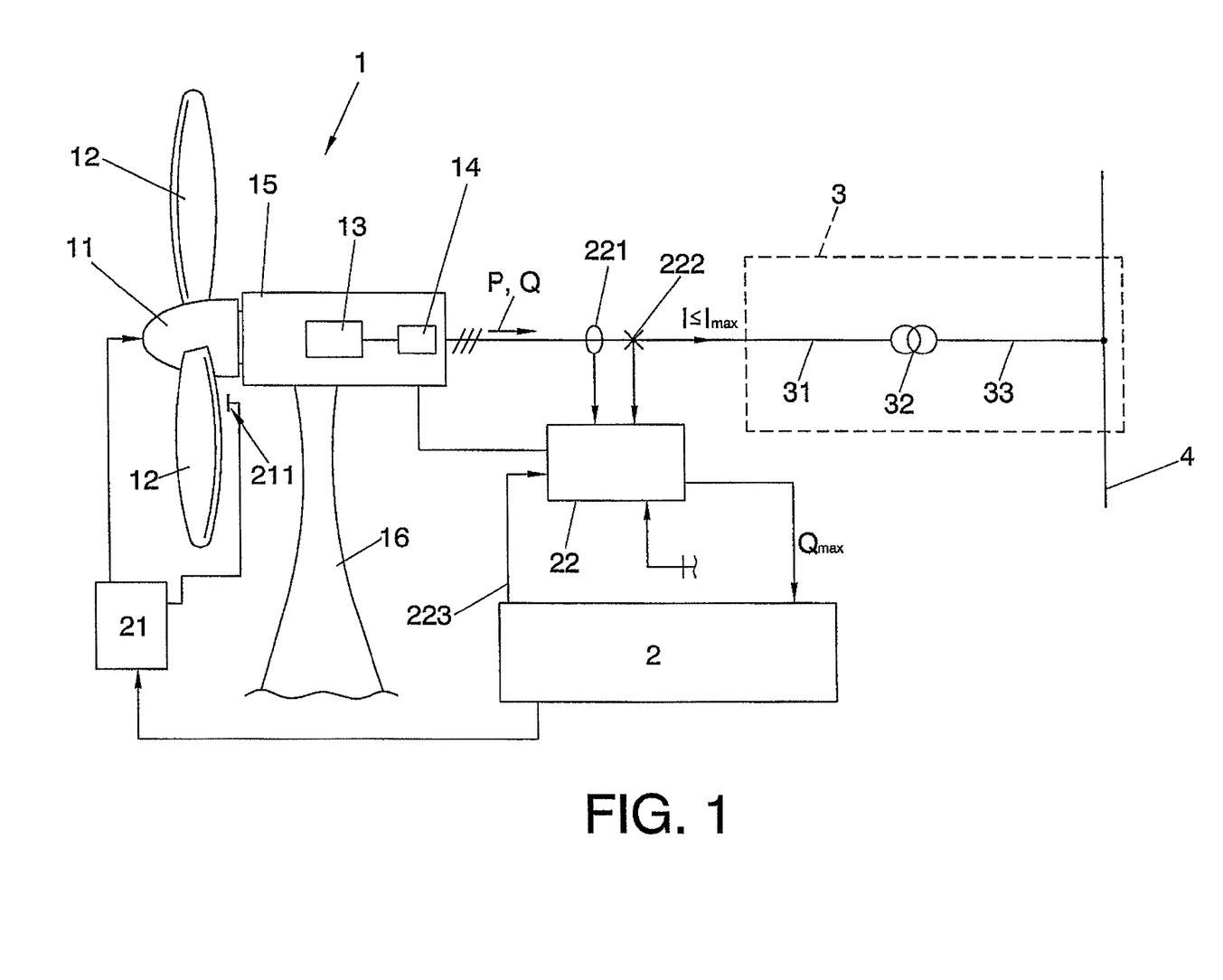
FIG. 1 schematically illustrates the structure of a system for wind power generation (the general structure shown in FIG. 1 could correspond both to a prior art system and to a system in accordance with the present invention, whereas the difference could reside in the way the control system is arranged, configured and/or programmed).

FIG. 1 schematically illustrates the structure of a system for wind power generation, including a wind turbine 1 with a rotor 11 with blades 12, the rotor being arranged so that it is made to rotate by the wind, thus producing the corresponding rotation, sometimes through a gearbox (not illustrated), of a generator 13 (namely, of a rotor part of said generator, said generator further comprising a stator part). The generator 13 produces an output AC voltage and can be connected to an electrical converter 14; currently, many different converter designs and arrangements are well known in this field and there is no need to further discuss them here; examples of converter arrangements that can be used within the framework of the present invention include full power converter arrangements (such as the one disclosed in U.S. Pat. No. 5,083,039) and doubly-fed induction generator arrangements such as those using back-to-back power converters (such as the one disclosed in U.S. Pat. No. 6,137,187), as well as systems such as the one disclosed in US-A-2003/0151259; the content of these documents is incorporated herein by reference.

The gearbox, the generator 13 and the electrical converter 14 can all be arranged within a housing or "nacelle" 15, which is normally mounted on a tower 16. However, also other arrangements are possible within the scope of the present invention.

The electrical converter 14 converts the AC voltage at the output of the generator 13 into a DC voltage, which is subsequently converted into an AC voltage (and current) at an output end of the converter 14, which is connected to the grid or network 4 for distribution of the power generated by the wind turbine to the consumers. This connection takes place through a supply line 3, which can comprise (as illustrated in FIG. 1) components such as a low voltage line 31, a transformer 32 and a high voltage line 33. In a full converter system, the entire power to the grid passes through the converter. In a doubly-fed induction generator system, a part of the power passes through the converter and another part is supplied to the grid without passing through the converter, for example by a connection between the stator and the grid that by-passes the power converter, such as illustrated in, for example, FIGS. 1 and 3 of US-A-2003/0151259. All this is conventional and it is not considered necessary to describe further herein.

Further, the system for wind power generation comprises a general control system, which can also be fully or partly arranged within the housing 15, although it can also be external to the housing. As illustrated in FIG. 1, this control system comprises a main controller 2, provided with the relevant software for the overall control of the system based on pre-stored information and on information provided by different sensors and, for example, on information or instructions from an external operator or operation software. This main controller 2 controls the operation of a pitch regulator 21, which is in charge of setting the pitch of the blades 12 of the rotor 11 on the basis of instructions received from the main controller and on information received from sensors 211 at the rotor. Further, there is a power controller 22 that receives inputs from one or more current sensors 221 and voltage sensors 222.

The power controller 22 operates the electrical converter 14 so as to provide the correct output power (active power P and reactive power Q) towards the grid, based on the current and voltage information provided by the respective current sensor 221 and voltage sensor 222, and on a power reference signal 223 provided by the main controller 2.

All this is conventional and it is not considered necessary to describe it more in detail. Especially, the way pitch and power regulation should take place in order to provide power to the network in accordance with power demand, network regulations and available wind is well known, and several different practical systems and methods for said control are known from prior art (cf., for example, U.S. Pat. No. 5,083,039, U.S. Pat. No. 6,137,187 and US-A-2003/0151259 referred to above).

Basically, there is an interest in providing a substantive amount of active power (that is, power corresponding to a current in phase with the voltage) towards the grid 4, through the supply line 3. However, it can also be of interest to provide reactive power, as this sometimes can help to support the grid.

The voltage and the current supplied through the supply line are detected by the corresponding detectors 221 and 222, and the power controller 22 thus obtains real-time information about the voltage (U) supplied to the grid, about the current (I) and about the phase difference ($\phi$) between power and voltage, whereby the active power ($P=U*I*\cos(\phi)$) and the reactive power ($Q=U*I*\sin(\phi)$) can be readily determined. Thus, the power controller can provide the relevant control signals to the converter 14 so as to keep the active and reactive power at the output end of said converter in line (as far as possible) with the power reference 223 received from the main controller.

The current supplied to the grid is a critical factor, as an excessive current can cause heating and damage to the grid and to components of the supply line 3. Thus, in accordance with the invention, a maximum current Imax is (pre)established, that should not be exceeded. If, for example, the voltage U drops on the supply line (for example, due to a shortcircuit in the grid), to continue providing the same amount of active and reactive power would imply increasing the current, which could cause damage to components of the system. Traditionally, this problem has maybe been less relevant as the generator, traditionally, has been disconnected from the grid when there was a voltage drop on the grid. However, this is no longer the case: in fact, there is a trend among at least some network operators to actually require the generator to continue connected to the grid also throughout the duration of a grid failure, although sometimes without supplying power to the grid.

In accordance with the invention, and in order to avoid any excessive current, the power controller 22 is arranged to operate on the converter so that, on the one hand, the active power P and the reactive power Q are, so far as possible, in line with what is determined by the power reference 223, but under the condition that the amplitude or magnitude of the total current (including the current component $I_P$ in phase with the voltage and the current component $I_Q$ that is out of phase by $\pi/2$ radians—90 degrees—with regard to the voltage) does not exceed a pre-established maximum current magnitude (Imax). When the magnitude of the total current approaches said maximum current magnitude, the power controller operates the converter to limit $I_P$ and/or $I_Q$ (and thus, at a fixed voltage, the corresponding active power P and/or reactive power Q) so as to keep the total current within the relevant limits. The power controller 22 can, based on the measured current and voltage values and on the basis of the amount of active power that should be supplied (or available for supply) to the network, calculate a maximum amount of reactive power (Qmax) that can be supplied to the network, and provide the corresponding information to, for example, the main controller, which can use this information for calculating the power reference 223.

The power controller 22 can be configured to give priority to the active power or to the reactive power, so as to reduce only one of them or one to a greater extent than the other one. For example, by reducing the angle between current and voltage, at a certain voltage drop the active power can be kept substantially constant and the total current can be kept under the corresponding maximum value, whereas less reactive power is supplied to the network 4, or vice versa.

Figure 2:
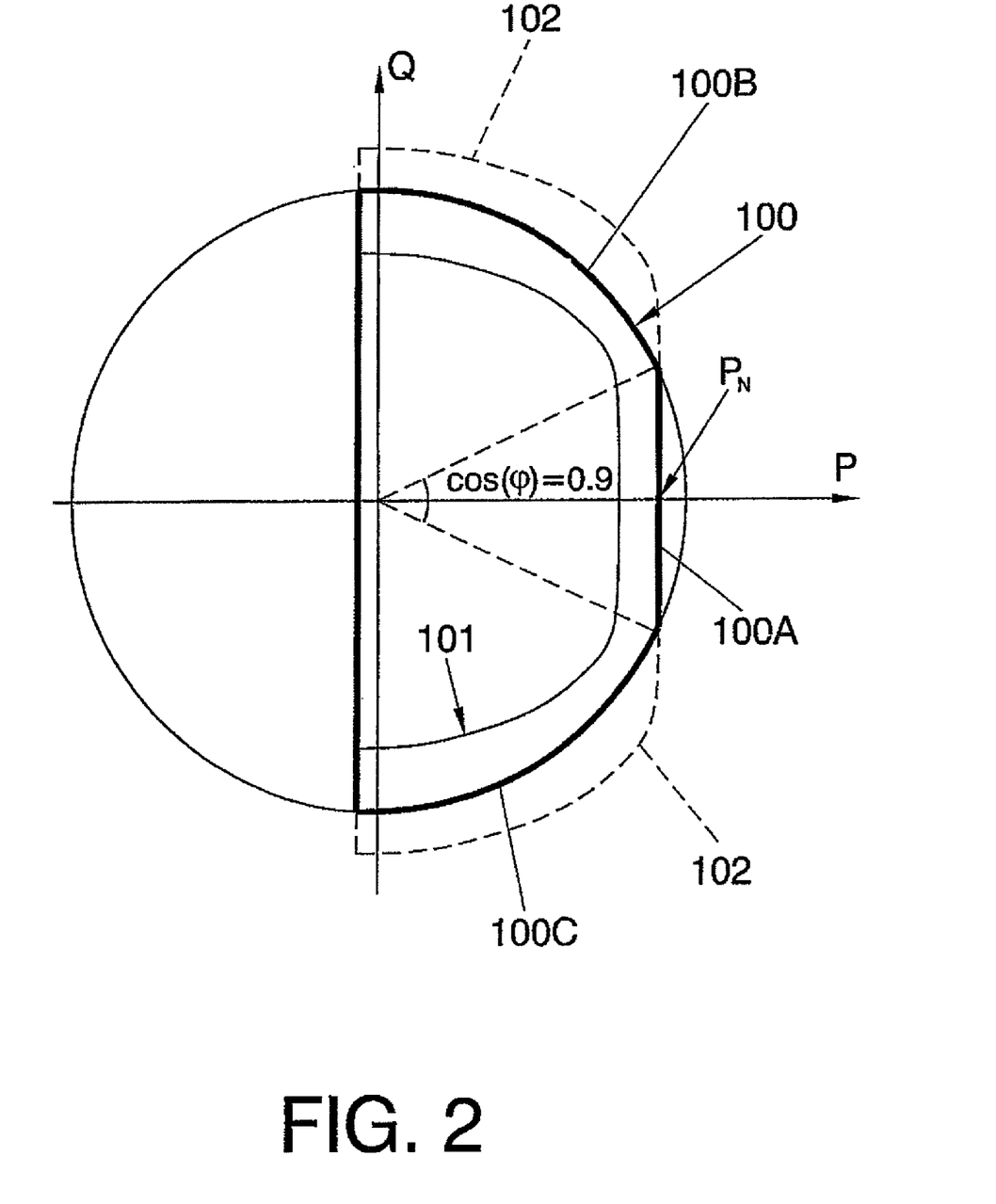
FIG. 2 is a diagram illustrating the power output to the grid from a system according to a preferred embodiment of the invention.

FIG. 2 is a diagram illustrating the power output to the grid from a system according to a preferred embodiment of the invention, wherein the horizontal axis represents the amount of active power (P) and the vertical axis the amount of reactive power (Q) supplied to the grid. The curve 100 represents the operation at nominal voltage $U_N$ (which in a typical system of this kind can be, for example, 690V at the output end of the converter 14). According to the phase difference $\phi$ between current and voltage (which can be conventionally controlled by the converter 14; for example, one way of controlling it is by controlling the active and reactive power, which thus gives a resulting phase angle $\phi$), for a constant current amplitude and voltage amplitude, it is possible to move along the curved portion (100B, 100C) of the curve 100, varying the relation between the active power and the reactive power as desired. Along this curved portion of the curve, the apparent power S ($S=\sqrt{P^2+Q^2}$) is constant.

The turbine has been designed to operate at the nominal voltage $U_N$ and, for example, at a certain $\cos(\phi)$ (for example, $\cos(\phi)=0.9$), then producing, at the nominal voltage $U_N$ and current $I_N$, an output nominal active power $P_N$. Thus, the mechanical system has been designed, in what regards its torque resistance, for example, to support a torque corresponding to this nominal power (with a corresponding safety margin). That is, it is not desired that the torque exceed the one corresponding to this nominal active power. Therefore, the control system is programmed so that if $\cos(\phi)$ increases above the relevant value (for example, in FIG. 4, if the angle $\phi$ decreases towards zero and $\cos(\phi)$ thus increases from 0.9 towards 1), the active power is controlled (for example, by current control) not to exceed the nominal active power. This is represented by the vertical straight portion 100A of the curve 100. Thus, during operation, even at the nominal voltage, S will not be held constant but will be reduced when the angle $\phi$ decreases towards zero, that is, when the reactive component is reduced towards zero, thus avoiding an excessive active power that could give rise to an excessive torque and to a corresponding risk of damage or wear on the mechanical part of the system, such as the drive train components (for example, the gearbox, main shaft, generator, etc.).

The system has been designed to work at the nominal voltage, and the current limit is set so that the power output can be kept constant by increasing the current when the voltage decreases within certain limits (that is, by a certain maximum amount or percentage), and by decreasing the current when the voltage increases. For example, the system can be designed for a voltage to be the nominal voltage $U_N \pm X$ %, such as $U_N \pm 10$%, for example, 690V±69V. That is, voltage fluctuations by ±10% can then be "accepted" by the system, which has been designed accordingly. Thus, the maximum current Imax can be set to be the nominal current $I_N*(1/0.9) \approx I_N*1.11$. This will allow operation along the nominal operation curve 100 by adapting the current according to the voltage, within the "accepted" range of fluctuation of the voltage (for example, ±10%). As the current is controlled so as not to exceed the maximum current Imax, and with the components selected to support Imax, there is no risk for damage of the components due to overcurrents (or overheating) (contrarily to what could occur if the apparent power S was kept constant, in which case a reduction of the voltage by more than the pre-defined amount, that is, in the example given above, such as by 20%: a constant apparent power S ($S=\sqrt{P^2+Q^2}$) would then require the current to be increased above Imax, that is, in the given example, by approximately 25% instead of by 11%).

In FIG. 2, the curve 101 schematically illustrates an operational curve in the case that the voltage decreases with, for example, twice the allowed amount, that is, in the example given above, by 20% instead of by the expected maximum variation of ±10%. In that case, it is no longer possible to operate along the curve 100, as this would require an increase of the current beyond Imax (such as by 25% instead of by 11% compared to the nominal current, considering the figures in the example above). That is, here, the apparent power is reduced to avoid potentially destructive overcurrents.

The curve 102 represent an extended operating area obtained by means of the present invention, compared to the alternative prior art approach based on a constant apparent power S. As Imax has been chosen so as to allow operation along the curve 100 at the lower end of the "expected" voltage range (for example, $U_N \pm 10$%), when the voltage is higher than the minimum voltage (of, for example, $U_N-10$%), for example, at a voltage of $U_N$ or $U_N+10$%, it is possible to increase the apparent power beyond the curve 100. The active power P is still to be limited to $P_N$ (for example, to maintain the torque within the pre-established limits on the basis of which the system was designed), but a higher (inductive or capacitive) reactive power Q can be generated and injected into the grid, which improves the flexibility of the system in what regards the reactive power support that it can provide to the grid.

Thus, the power controller 22 can, based on the actual measured network voltage, the maximum magnitude Imax of the current and the active power P that is supplied or should be "available" for supply, establish a maximum reactive power Qmax, that will limit the corresponding power reference signals 223 sent to the power controller from the main controller.

Thus, the maximum reactive power that can be supplied will depend on the measured voltage and on the active power that the system should be able to provide, and will be (further) limited by said maximum magnitude Imax of the current.

Thus, the system does not only reduce the risk for problems and damages due to overcurrents (overheating) that could arise if the apparent power S was to kept constant (also at voltages lower than the ones "tolerated" by the design of the system), but also makes it possible to increase the reactive power that can be injected into the grid, thus enhancing the grid support capability of the system.

The negative active power illustrated in FIG. 2 could correspond to internal losses in the generator and converter when the generator is substantially not driven by the wind and when thus no active power is produced by the system, which could nevertheless continue to be connected to the grid, consuming some active power to compensate for those losses, while injecting reactive power into the grid, for the purpose of supporting the grid.

Figure 3:
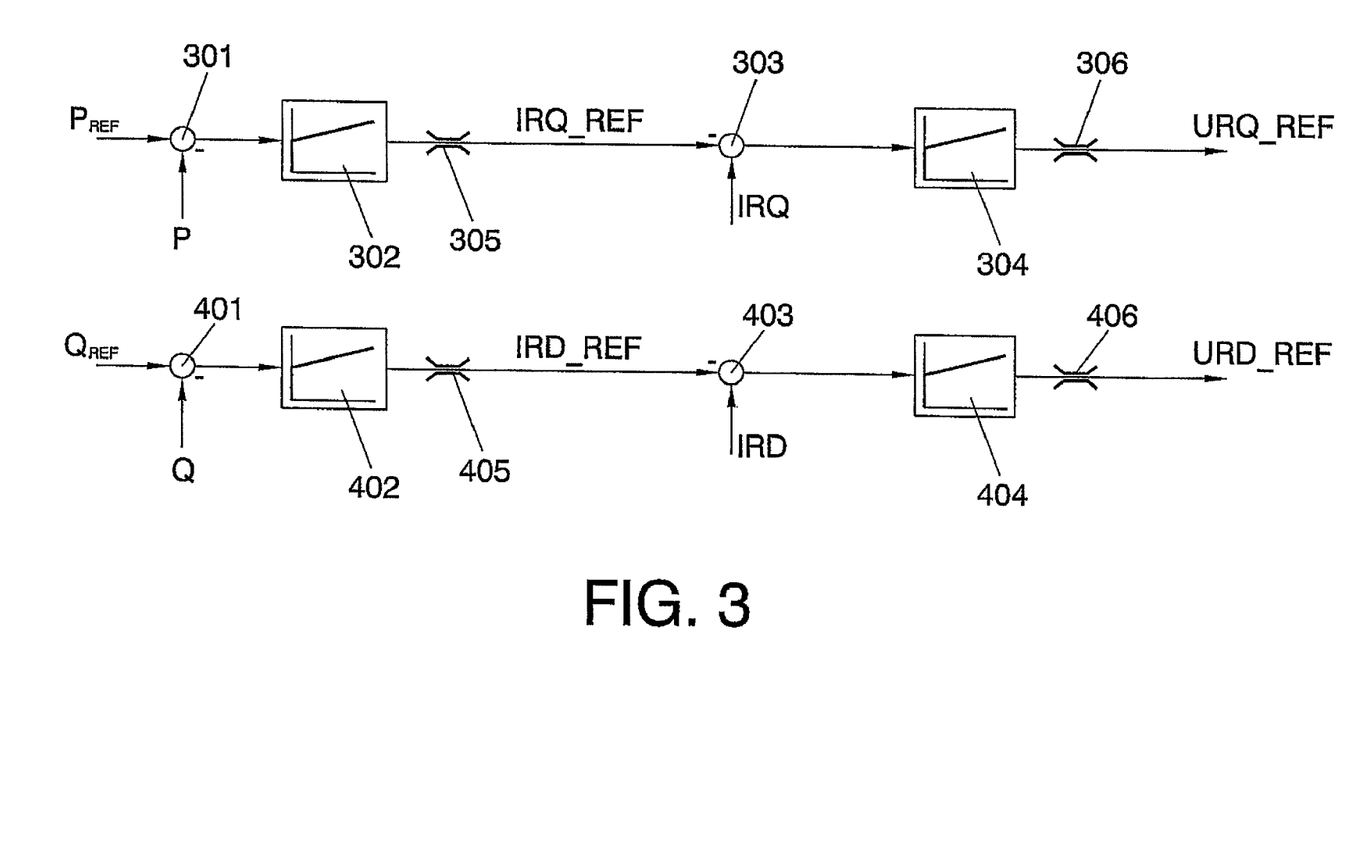
FIG. 3 schematically illustrates a part of the power controller of a system in accordance with a preferred embodiment of the invention.

FIG. 3 schematically illustrates a part of what could be the power controller 22 of FIG. 1. Basically, it comprises two control loops, one for the active power and one for the reactive power.

Considering the active power loop, it comprises a summation operator 301 for subtracting a first reference signal $P_{REF}$ corresponding to the "desired active power" (which can be limited so as to prevent the active power from increasing beyond a limit such as the nominal power $P_N$ limit discussed above with reference to FIG. 2) to be supplied to the grid, as established by the general control system (and, for example, communicated to the power controller as part of the power reference signal 223 provided by the main controller 2, as described above with reference to FIG. 1), with a measured active power P. The difference is supplied to an active power PID controller 302, which produces an active current reference (IRQ_REF) which is supplied to summation operator 303 where it is compared to the measured active current (IRQ), whereafter a corresponding difference signal is supplied to the active current PID controller 304, producing an output reference voltage (URQ_REF) which is used to control the converter (for example, it can be supplied to control the pulse width modulation of a conventional converter system).

Similarly, the reactive power loop comprises a summation operator 401 for comparing a first reference signal $Q_{REF}$ corresponding to the "desired reactive power" (for example, corresponding to part of the power reference signal 223 provided by the main controller 2, as described above with reference to FIG. 1) to be supplied to the grid, with a measured reactive power Q. The difference is supplied to a reactive power PID controller 402, which produces a reactive current reference (IRD_REF) which is supplied to a summation operator 403 where it is compared to the measured reactive current (IRD), whereafter a corresponding difference signal is supplied to the reactive current PID controller 304, producing an output reference voltage (URD_REF) which is also used to control the converter (for example, by pulse width modulation).

The power control system further comprises an active current limiter 305 and a reactive current limiter 405, arranged to guarantee that the total current shall not exceed a certain threshold, by limiting the reference currents (the output signals from the active 302 and reactive 402 power PID controllers) accordingly. Thus, by means of these current limiters 305/405, it is possible to prevent the total current from exceeding a certain threshold. For example, it can be established that the value of $\sqrt{IRQ\_REF^2 + IRD\_REF_Q^2}$ shall not exceed a certain threshold, corresponding to the maximum magnitude (Imax) of the total current. The two current limiters can be coordinated so that preference is given to the active or to the reactive current, depending on, for example, whether preference is to be given to active power or to reactive power to be supplied to the grid. For example, frequently, it can be preferred to give preference to the active power generation. The preference can, for example, be set by setting a parameter giving a higher priority either to the reactive or to the active power generation. For example, the limit can be set so as to achieve the production of nominal active power and the rest of the "available" current can be used for the supply of reactive power, to the extent that it is desired in order to, for example, provide reactive power support to the network. The "available" current for reactive power $I_{Q\text{-}available}$ can at any moment be determined by the formula $$=I_{Q\text{-}AVAILABLE}=\sqrt{(Imax)^2-(I_P)^2}$$

where Imax is the above-mentioned maximum current magnitude, and $I_P$ is the active current provided to the grid.

A further set of limiters 306/406 can be provided at the output of the current PID controllers 304/404, to limit the voltage reference to the converter system to avoid overmodulation of the converter system, thus avoiding higher harmonics.

While the approach suggested in U.S. Pat. No. 6,906,431 (which, if applied to the system illustrated in FIG. 3, would correspond to some kind of control of the input references for the active and the reactive power, so that for example the value of $\sqrt{P_{REF}^2 + Q_{REF}^2}$ would be set to be constant, thus implying a constant apparent power) does not imply an effective protection against overheating, as it does not involve a control of the current level as such, the present invention provides such an effective prevention of such overheating, as the level of the total current is effectively controlled.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. Wind power system, comprising an installation (1) for generating electrical power from wind by means of at least one power generating turbine arranged to be rotated by wind, and a control system (2), said control system including a power controller (22) for controlling the supply of electrical power from said wind power system to a network (4) for distribution of electrical power to a plurality of consumers, wherein the power controller comprises means for controlling a current supplied towards said network by said wind power system in accordance with at least one input parameter (223), wherein the power controller (22) is configured to keep the magnitude of the total current supplied towards the network below a pre-set maximum magnitude (Imax), the control system is arranged to establish, in view of a measured network voltage and in view of the active power that is supplied towards the network, a maximum amount of reactive power (Qmax) that can be supplied towards said network, said maximum amount of reactive power being selected so that said total current will not exceed said pre-set maximum magnitude (Imax), and the system is arranged so as to prevent the active power from increasing beyond a pre-determined level ($P_N$), the control system being configured to allow for a reduction of the apparent power when the phase angle between voltage and current decreases below a certain level, so as to prevent an excessive torque on mechanical components of the system.

2. Wind power system according to claim 1, wherein the total current is determined by the formula $$I=\sqrt{\sqrt{I_P^2+I_Q^2}}$$

wherein I is the amplitude of the total current, $I_P$ is the amplitude of the current component in phase with the voltage, and $I_Q$ is the amplitude of the current component having a phase difference of $\pm\pi/2$ radians with regard to the voltage.

3. Wind power system according to claim 1, wherein the power controller is configured to operate the wind power system so as to supply a predetermined amount of active power (P) and a predetermined amount of reactive power (Q) towards the network in accordance with an active power reference signal and a reactive power reference signal, wherein the power controller is further arranged to control the current supplied by the wind power system and to adapt the active power (P) and reactive power (Q) so that said total current does not exceed said pre-set maximum magnitude (Imax).

4. Wind power system according to claim 1, wherein the power controller is configured to operate the wind power system so as to supply a predetermined amount of active power (P) and a predetermined amount of reactive power (Q) towards the network in accordance with an active power reference signal and a phase angle reference signal, wherein the power controller is further arranged to control the current supplied by the wind power system and to adapt the active power (P) and phase angle so that said total current does not exceed said pre-set maximum magnitude (Imax).

5. Wind power system according to claim 3, wherein the control system is configured to increase the current supplied by the wind power system when there is a drop in the voltage at an output end of the wind power system, so as to continue to supply, as far as possible, said predetermined amounts of active power and reactive power, with the condition that the current does not exceed said pre-set maximum magnitude (Imax).

6. Wind power system according to claim 3, arranged so as to give preference to the supply of active power (P) or to the supply of reactive power (Q) in a situation in which it is not possible to supply the pre-established amounts of said active power and reactive power without letting the total current exceed said pre-set maximum magnitude (Imax).

7. Wind power system according to claim 1, wherein the power controller (22) comprises a control loop for active power and a control loop for reactive power, wherein the control loop for active power includes means (302) for generating an active current reference signal and wherein the control loop for reactive power includes means (402) for generating a reactive current reference signal, wherein said control system further comprises means (305, 405) for limiting said active current reference signal and reactive current reference signal so as to prevent the total current from exceeding said pre-set maximum magnitude (Imax).

8. Wind power system according to claim 7, wherein said power controller (22) is arranged limit said active current reference signal and reactive current reference signal in accordance with at least one preference indicator stored in the system, so that preference is given to the limitation either of said active current reference signal or said reactive current reference signal.

9. Method of operating a wind power system comprising an installation (1) for generating electrical power from wind by means of at least one power generating turbine arranged to be rotated by wind so as to supply current towards a network (4) for distribution of electrical power to a plurality of consumers, the method comprising the steps of:

keeping the magnitude of the total current supplied towards the network below a pre-set maximum magnitude (Imax);

establishing, in view of a measured network voltage and in view of the active power that is supplied towards the network, a maximum amount of reactive power (Qmax) that can be supplied towards said network, said maximum amount of reactive power being selected so that said total current will not exceed said pre-set maximum magnitude (Imax), and preventing the active power from increasing beyond a pre-determined level (PN) and allowing for a reduction of the apparent power when the phase angle between voltage and current decreases below a certain level, so as to prevent an excessive torque on mechanical components of the system.

10. Method according to claim 9, wherein the total current is determined by the formula $$I=\sqrt{\sqrt{I_P^2+I_Q^2}}$$

wherein I is the amplitude of the total current, IP is the amplitude of the current component in phase with the voltage, and IQ is the amplitude of the current component having a phase difference of $\pm\pi/2$ radians with regard to the voltage.

11. Method according to claim 9, wherein the wind power system is operated so as to supply a predetermined amount of active power (P) and a predetermined amount of reactive power (Q) towards the network in accordance with an active power reference signal and a reactive power reference signal, and further comprising the step of controlling the current and to adapt the active power (P) and reactive power (Q) so that the total current does not exceed said pre-set maximum magnitude (Imax).

12. Method according to claim 9, wherein the wind power system is operated so as to supply a predetermined amount of active power (P) and a predetermined amount of reactive power (Q) towards the network in accordance with an active power reference signal and a phase angle reference signal, and further comprising the step of controlling the current and to adapt the active power (P) and phase angle so that the total current does not exceed said pre-set maximum magnitude (Imax).

13. Method according to claim 11, further comprising the step of increasing the current supplied by the wind power system when there is a drop in the voltage at an output end of the wind power system, so as to continue to supply, as far as possible, said predetermined amounts of active power and reactive power, with the condition that the current does not exceed said pre-set maximum magnitude (Imax).

14. Method according to claim 10, further comprising the step of giving preference to the supply of active power (P) or to the supply of reactive power (Q) when a situation occurs in which it is not possible to supply the pre-established amounts of said active power and reactive power without letting the total current exceed said pre-set maximum magnitude (Imax).

15. Method according to claim 9, further comprising the steps of, in a control loop for active power, generating (302) an active current reference signal, and in a control loop for reactive power, generating a reactive current reference signal, while limiting (305, 405) said active current reference signal and reactive current reference signal so as to prevent the total current supplied towards the grid from exceeding said pre-set maximum magnitude (Imax).

16. Wind power system according to claim 15, further comprising the step of limiting said active current reference signal and reactive current reference signal in accordance with at least one preference indicator, so that preference is given to the limitation either of said active current reference signal or said reactive current reference signal.

\* \* \* \* \*